PULSE DISTRIBUTOR UTILIZING ONE BISTABLE DEVICE PER STAGE

Filed Sept. 12, 1962 5 Sheets-Sheet 1

INVENTOR
G. W. WELLS
BY Sylvan Sherman
ATTORNEY

Feb. 2, 1965 G. W. WELLS 3,168,657

PULSE DISTRIBUTOR UTILIZING ONE BISTABLE DEVICE PER STAGE

Filed Sept. 12, 1962 5 Sheets-Sheet 2

INVENTOR
G. W. WELLS
BY Sylvan Sherman
ATTORNEY

INVENTOR
G. W. WELLS
BY
Sylvan Sherman
ATTORNEY

INVENTOR
G. W. WELLS
BY Sylvan Sherman
ATTORNEY

Feb. 2, 1965 G. W. WELLS 3,168,657
PULSE DISTRIBUTOR UTILIZING ONE BISTABLE DEVICE PER STAGE
Filed Sept. 12, 1962 5 Sheets-Sheet 5

INVENTOR
G. W. WELLS
BY Sylvan Sherman
ATTORNEY 3,168,657

PULSE DISTRIBUTOR UTILIZING ONE BISTABLE DEVICE PER STAGE

George W. Wells, Lincroft, N.J., assignor to Bell Telephone Laboratories, Incorporated, New York, N.Y., a corporation of New York Filed Sept. 12, 1962, Ser. No. 223,160
3 Claims. (Cl. 307—88.5)

This invention relates to pulse translating circuits and more particularly to high-speed stepping switch circuits.

In general, stepping switches are composed of a chain of interconnected binary counters. In the past some stepping switches have employed junction transistor binary counters, each stage having at least two transistors with rather complex coupling circuitry between them. More recent stepping switches have utilized other semiconductor devices including the so-called "avalanche" transistor and special pnpn "triodes." A stepping switch utilizing the latter device is illustrated in United States Patent No. 3,040,196, granted to L. A. D'Asaro on June 19, 1962.

The prior art stepping switches patterned after such designs are generally satisfactory but possess characteristics which can limit their application to circuits wherein the external parameters are closely controlled. Such defects as "turn on" of multiple stages simultaneously and stepping in the reverse direction can result when the drive current exceeds the nominal operating value.

Accordingly, one object of the present invention is to increase the reliability of a stepping switch when operating over a wide range of current values.

Another somewhat undesirable characteristic commonly found in semiconductor stepping switches of the prior art is the necessity of having all the active elements balanced (i.e., of substantially identical electrical characteristics). As is known, the ability of present manufacturing techniques to provide semiconductor devices of substantially identical electrical characteristics is limited; therefore, switches whose basis of operation depends, in large degree, upon the uniformity of the constituent components are more time-consuming and expensive to construct, since each element must be tested and matched to the others.

It is, therefore, another object of the present invention to provide a stepping switch whose usefulness does not depend upon close tolerances among the electrical characteristics of its various active elements.

Another object of the present invention is to reduce the over-all complexity of stepping switches.

In keeping with the principles of the present invention stepping switches can be realized using thyratron gas tubes, avalanche transistors, pnpn triodes or other device, of similar electrical characteristics as the active switching elements. Because of the many advantages enjoyed by semiconductor devices, however, the various embodiments of the present invention will be illustrated using such devices as the active elements. The electrical characteristics of these devices are analogous to those of the voltage-operated thyratron gas tube. That is, upon application of a small biasing current at the gate electrode the device "turns on" regeneratively. This regenerative "turn on" occurs because the current amplification, $\alpha$, of the device is an increasing function of the device current. At a predetermined low current level $\alpha$ becomes greater than unity and regeneration takes place. When this occurs, the current through the device is limited only by the external circuitry. Generally, a gate current in the order of a few tenths of a milliampere is sufficient to achieve this condition.

There are two ways in which such a device can be restored to the "off" state from the "on" condition. A reverse biasing current may be applied at the gate or the device current may be interrupted briefly. The latter type of operation is preferred and is utilized in practicing the present invention; first, in order to reduce the power requirements, and second, to ensure faster rise times for the stepping operation.

In one embodiment of the present invention a plurality of such 3-terminal devices are connected in a linear array to form the active elements of a stepping switch. Drive current and memory or sustaining current for the circuit are provided by a two-phase power supply. The circuit is designed so that a drive current pulse furnishes output power to one stage while simultaneously furnishing gate biasing current to the next succeeding stage. Sustaining current of low magnitude serves to maintain the succeeding stage in the "on" condition until the drive pulse current on the next phase is provided.

In a second embodiment, designed for use as a clock pulse generator, the gate bias current is provided by a capacitor which charges during the interval in which a drive current pulse is conducted through its corresponding stage and discharges through the gate electrode of the next succeeding stage to switch it "on."

A novel "starting" or "triggering" circuit is also utilized to eliminate the possibility of circulating or perpetuating error pulses which can be accidentally introduced into the stepping switch. This circuit functions as a switch which maintains the first stage in the "off" condition until all the succeeding stages have turned "on" and "off" sequentially. The starting circuit then switches a biasing resistor into the gate path of the first stage so that the next drive pulse to that stage triggers the stepping sequence. This circuit is also advantageous in that it allows either an even or an odd number of stages to be utilized in the clock pulse generator.

The above mentioned and other features and objects of this invention will become more apparent by reference to the following description taken in conjunction with the accompanying drawings in which.

Figure 1:
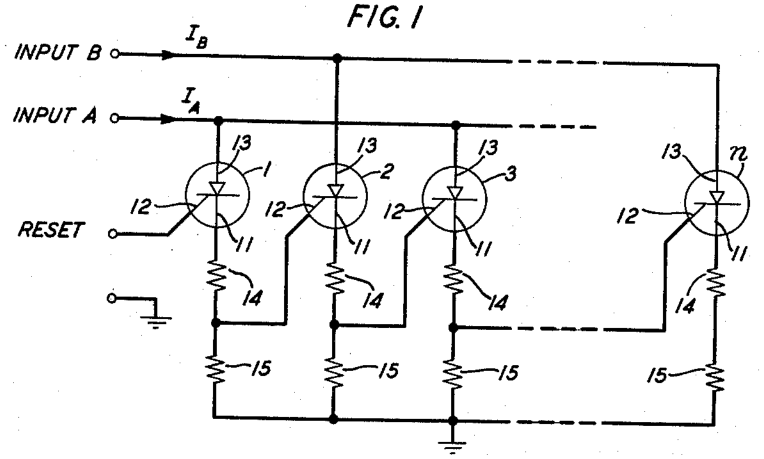
FIG. 1 is a schematic representation of a stepping switch in accordance with the principles of the present invention.

Referring more particularly to the drawings, FIG. 1 shows a stepping switch utilizing a plurality of 3-terminal pnpn devices 1, 2, 3, . . . *n*, where *n* can be either odd or even. The broken lines indicate the presence of intermediate stages whose number depends on the desired application at hand. The pnpn devices shown are for the purposes of illustration only and should not be deemed as in any way limiting the scope of the invention. As mentioned, any devices having the electrical characteristics mentioned above can be utilized.

It will be convenient to describe the various electrodes of the pnpn device by the terminology more common to the thyratron gas tube. Accordingly, the electrodes to the "n" and "p" end zones will hereinafter be called the "cathode" and "anode," respectively, and the control electrode to the intermediate zone the "gate" electrode.

Each of the 3-terminal pnpn devices 1, 2, 3, . . . $n$ has a cathode 11 connected to ground through the serial combination of a load 14 and a voltage dropping resistor 15. In practice each load can consist of any relatively low impedance, such as several serially connected low impedance windings in a memory array; however, for the sake of simplicity, the loads are shown herein as resistors. Generally speaking, the voltage dropping resistors 15 have a value of only a few ohms.

Anodes 13 of each of the odd-numbered pnpn devices 1, 3, . . . etc., are connected to a first input bus labeled "Input A." The corresponding anodes 13 of each of the even numbered stages, 2, 4, 6, . . . etc., are connected to a second input bus labeled "Input B." Although the $n$th stage is shown connected to "Input B," this is merely illustrative, since it can be connected to "Input A" depending upon the number of stages utilized (i.e., whether $n$ is even or odd). The gate electrodes 12 of each pnpn device, except the first, are connected to the junction formed by the connection of load 14 and resistor 15 of the immediately preceding stage. The stage electrode 12 of pnpn device 1 of the first stage is connected to the "reset" terminal.

Figure 2:
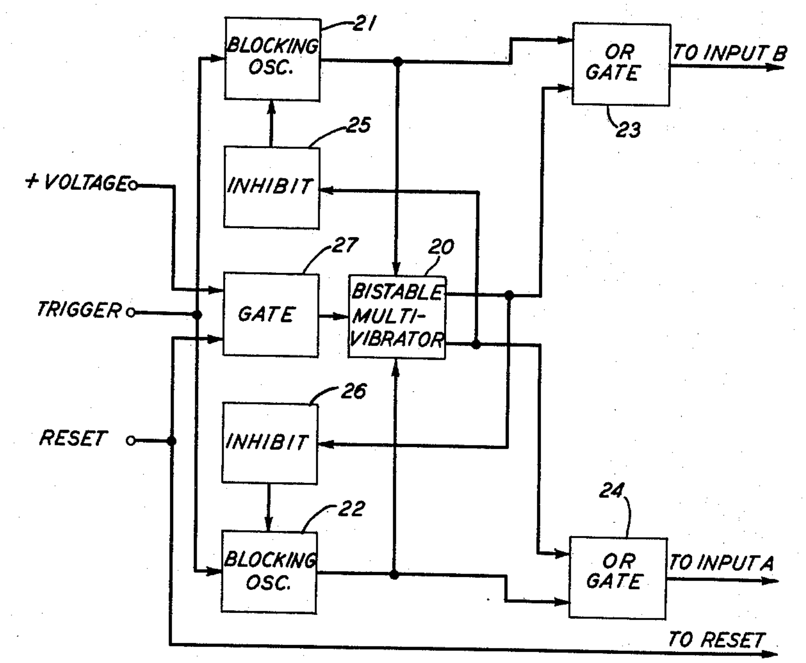
FIG. 2 is a block diagram of a two-phase power supply for use in supplying power to the embodiment of FIG. 1.

FIG. 2 shows, in block diagram, a two-phase power supply which can be utilized to supply the voltages and currents ot Inputs A and B of the stepping switch of FIG. 1. A low magnitude sustaining current for the stepping switch is supplied to each output phase alternately by bistable multivibrator 20. The high magnitude drive pulses for the loads are supplied by blocking oscillators 21 and 22. These pulses together with the sustaining current are supplied to Inputs A and B of FIG. 1 through OR gates 23 and 24. The INHIBIT circuits 25 and 26 serve to prevent the blocking oscillators 21 and 22 from generating drive pulses during the time interval in which the sustaining current for the other phase is being supplied.

Gate 27, coupled to multivibrator 20 serves to interrupt the power to that device momentarily upon application of a reset signal. The reset signal also places pnpn device 1 of the first stage in its high conductance or "on" state. When power is restored to multivibrator 20, memory current on phase A maintains device 1 in this state.

Figure 3:
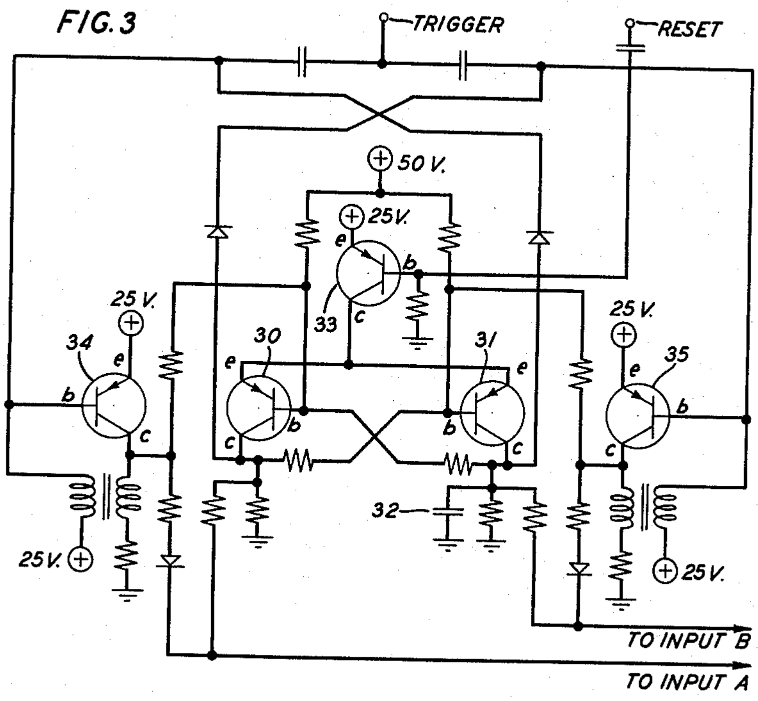
FIG. 3 is a schematic diagram of the power supply depicted in the block diagram of FIG. 2.

FIG. 3 is a schematic diagram of a two-phase power supply which corresponds to the block diagram of FIG. 2 and which can be used to supply the necessary current pulses to the embodiment of FIG. 1. Since the circuit of FIG. 3 is merely a combination of circuits well known in the art, it need be described only briefly herein.

Transistors 30 and 31 are connected as a bistable multivibrator in a circuit which is analogous to the vacuum tube circuit shown on page 140 of "Pulse and Digital Circuits," by J. Millman and H. Taub, McGraw-Hill Book Co., Inc., New York, 1956. Capacitor 32 has been added in order to slow the rise time of the collector of transistor 31 so that transistor 30 will turn on upon application of power.

Transistor 33 is connected between the common emitter connection of transistors 30 and 31 and the direct current power source, not shown. Transistor 33 functions merely as a switch or gate, turning the multivibrator circuit "off" momentarily upon application of a reset signal.

Transistors 34 and 35 each comprise the active elements of the blocking oscillators used to supply the drive current pulses for the stepping switch of FIG. 1. A description of these circuits, as well as that of the gate circuit, can be found in the above-mentioned book by Millman and Taub.

Figure 4:
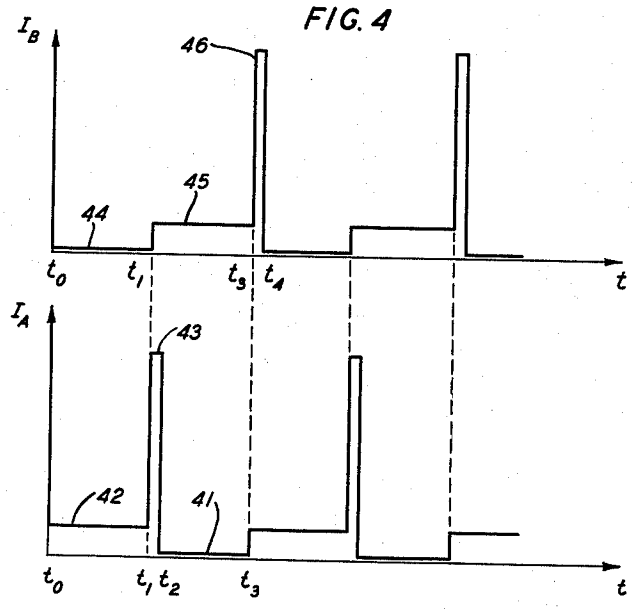
FIG. 4 is a graphical representation of the output currents of the power supply of FIGS. 2 and 3.

The resulting output current from the power supply is shown in the graph of FIG. 4. The current in Input A, designated $I_A$, has three levels, the first or lowest of which, 41, has a magnitude which is substantially zero. The second or intermediate level 42 represents the sustaining current. Typically, this current has a value of approximately 10 milliamperes in the circuit illustrated. The third or highest level 43 represents the drive current. Although FIG. 4 is not drawn to scale, the magnitude of the drive current is typically 20 or more times that of the sustaining current. Its magnitude is limited only by the current handling capabilities of the semiconductors and other circuit elements utilized.

The current through Input B, $I_B$, likewise has three levels 44, 45, and 46 which correspond to the levels 41, 42, and 43 of current $I_A$. The relative phases are adjusted so that the drive pulse 43 of current $I_A$ switches the sustaining current from Input A to Input B. Similarly, the drive pulse 46 of current $I_B$ switches the sustaining current back to Input A from Input B.

The operation of the stepping switch of FIG. 1 can now be explained with the aid of the current waveforms shown in FIG. 4. Initially, at time $t_0$, pnpn device 1 is in its high conductance, or "on," state. The remaining devices 2, 3, . . . $n$ are in the low conductance, or "off" state. Sustaining current 42, flowing in Input A, serves to maintain pnpn device 1 in its "on" state but due to its low magnitude does not substantially affect the load. The second stage remains in its "off" condition until time $t_1$ when the drive pulse 43 is applied on Input A.

At time $t_1$ the high magnitude current of the drive pulse flows through pnpn device 1 and furnishes power to the load. The same current produces a voltage drop across resistor 15 associated with the first stage, thereby switching pnpn device 2 into its "on" state. Also at time $t_1$ the sustaining current is switched from Input A to Input B, therbey maintaining device 2 in this "on" condition after drive pulse 43 has ceased. At time $t_2$, drive pulse 43 has fallen to a low value, below that which is needed to maintain pnpn device 1 in its "on" state. This places pnpn device 1 in its "off" state. The above stepping sequence is repeated with devices 2 and 3, etc., until the last stage is in its "off" state. To repeat the stepping sequence pnpn device 1 is restored to its "on" condition either by a reset signal applied to the power supply, or, if there are an even number of stages, by the last stage. The stepping switch can then be triggered into operation just as before.

Figure 5:
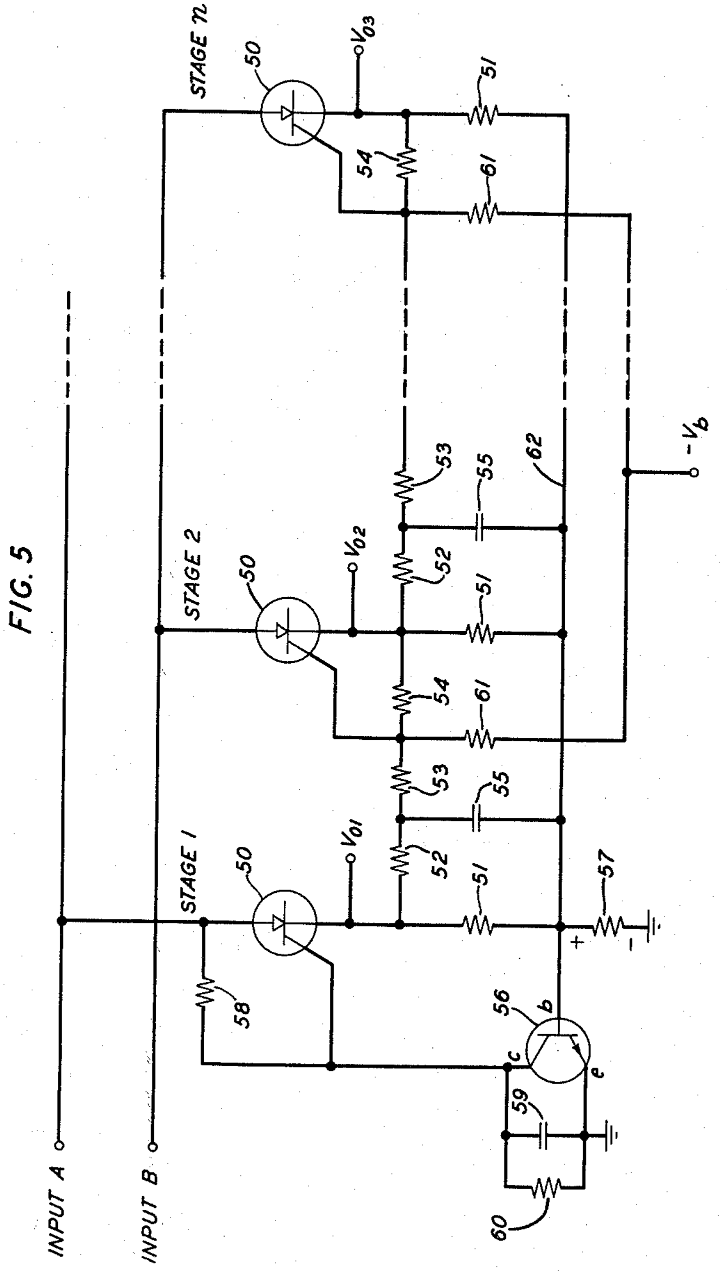
FIG. 5 is a schematic representation of a clock pulse generator in accordance with the principles of the present invention.

FIG. 5 is a schematic representation of a clock pulse generator also in accordance with the principles of the present invention. The clock pulse generator consists of a plurality of stages labeled Stage 1, Stage 2, etc. The dashed lines indicate the presence of intermediate stages between the second and the $n$th, the number of which is determined by the external design consideration. As in the previous embodiment, the $n$th stage can be either odd or even numbered depending upon the number of intervening stages. In the illustrative embodiment of FIG. 5, each stage consists of a 3-terminal pnpn device 50 together with its associated resistors and capacitors.

In the embodiment of FIG. 5 the cathode of each pnpn device 50 is connected through a resistor 51 to a common bus 62. Between each cathode and the corresponding cathode of the next succeeding stage is connected the serial combination of three resistors 52, 53, and 54. Capacitors 55 are connected between each junction formed by the connection of resistors 52 and 53 and the common bus 62. The common bus 62, in turn, is connected to ground through another resistor 57. The gate electrode of the device of each stage, except that of the first, is connected to the junction formed by the connection of resistors 53 and 54 of the preceding stage. Each of these junctions is, in turn, connected through a biasing resistor 61 to a source of negative direct current potential $V_b$.

The anodes of the odd-numbered stages are connected to input terminal A and those of the even-numbered stages to input terminal B. Inputs A and B supply the two-phase power pulses needed to drive the clock pulse generator. The output for each stage is taken at terminals designated $V_{O1}$, $V_{O2}$, . . . $V_{On}$ connected to the cathodes of the respective stages.

The "start" or "trigger" circuit of the clock pulse generator consists of an npn transistor 56 connected in a common emitter configuration to the gate electrode of the device 50 of Stage 1. The base of transistor 56 is connected to bus 62 and the collector is connected directly to the gate electrode of Stage 1. A parallel combination of a capacitor 59 and a resistor 60 is connected between the grounded emitter and the collector. A resistor 58 connected between the gate electrode and the anode of device 50 of the first stage completes the trigger circuit.

Figure 6:
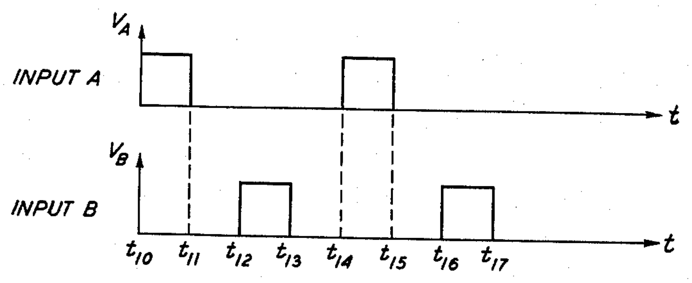
FIG. 6 is a graphical representation of the driving pulses utilized to power the embodiment of FIG. 5.

FIG. 6 is a graphical representation of the drive pulse voltage supplied to Inputs A and B of the clock pulse generator. The input signals consist of uniform pulses, the magnitudes of which are insufficient by themselves to drive any of the pnpn devices into its "on" state unless they are coincident with a gate current. The drive pulse, $V_A$, is applied to Input A between times $t_{10}$ and $t_{11}$; no voltage appears at either input between times $t_{11}$ and $t_{12}$; $V_B$ is applied to Input B between times $t_{12}$ and $t_{13}$; and finally no voltage is applied to either input from times $t_{13}$ to $t_{14}$. At time $t_{14}$ the above sequence of input pulses and spaces repeats itself.

A unique feature of the embodiment of FIG. 5 lies in the utilization of a novel starting circuit comprised of transistor 56, resistors 57, 58, and 60 and capacitor 59. In prior art clock pulse generators, such as those of the ring-counter type, special precautions must be taken in order to prevent the repetition and circulation of error pulses which can be introduced into the clock by noise or other transient signals. The starter circuit of the present embodiment avoids this undesirable characteristic by initiating a new pulse only after all previous pulses have been stepped out of the circuit, as will be explained in greater detail hereinafter.

The operation of the embodiment of FIG. 5 can now be explained with the aid of FIG. 6. Prior to time $t_{10}$, it is assumed that all of pnpn devices 50 are in their low conductance or "off" state. At time $t_{10}$ a first drive pulse is applied to Input A. Since this pulse alone has insufficient magnitude to cause any of the odd-numbered stages to conduct, no output pulse initially appears. Due to the presence of voltage dividing resistors 58 and 60, however, a positive potential is soon established at the gate electrode of device 50 of Stage 1 during the time interval between $t_{10}$ and $t_{11}$. The time it takes for this potential to develop is determined by the time constant of the combination of capacitor 59 and resistor 60.

As soon as the current through the gate of device 50 of Stage 1 reaches the threshold or "turn on" value, this stage switches to its "on" condition and a drive pulse current flows through the stage. The resulting current flowing through resistors 51 and 57 produces an output voltage $V_{O1}$.

At the same time, the voltage drop caused by the drive current in resistor 57 causes a positive potential to appear on bus 62. This, in turn, switches npn transistor 56 from its "off" state to its high conductance or "on" state, and effectively grounds and gate electrode of device 50 of Stage 1. As was mentioned above, however, once current is flowing through a device such as pnpn device 50 it cannot ordinarily be extinguished by merely reducing the biasing current to zero. Accordingly, device 50 of Stage 1 continues to conduct drive current until the drive pulse reduces to zero at time $t_{11}$. Stage 1 will not thereafter again switch to its "on" condition due to the action of transistor 56, as will be explained in greater detail hereinbelow. Briefly, however, as long as any other stage is conducting, drive current through resistor 57 will maintain bus 62 at a positive potential sufficient to cause transistor 56 to conduct. This, in turn, maintains Stage 1 in an "off" state.

Returning to Stage 1, it is seen that during the time from $t_{10}$–$t_{11}$ the drive current also causes capacitor 55 to charge through resistor 52, thereby raising the potential on the gate electrode of Stage 2. This potential causes the current through the gate to exceed its threshold value and places Stage 2 in condition for conducting the drive pulse of voltage $V_B$. At time $t_{11}$ the drive current ceases and capacitor 55 starts to discharge exponentially. However, the resistance values are chosen so that at time $t_{12}$ capacitor 55 still has enough charge to maintain device 50 of Stage 2 in condition for conducting. Thus, at time $t_{12}$ Stage 2 starts to conduct in response to the drive pulse provided at Input B. Thereafter the stepping continues down the device, stage by stage, in the above manner.

It should be noted, however, that capacitor 55 of the first stage must be sufficiently discharged by time $t_{16}$, that the drive pulse, then appearing on Input B, does not cause Stage 2 to conduct. This requirement, as well as the first requirement that capacitor 55 must be of sufficient charge to cause conduction in the second stage at time $t_{12}$, is satisfield by the proper proportioning of the values of resistors 51, 52, 53, 54 and 61 and biasing voltage $V_b$.

In order that the novel features of the trigger circuit utilized in the embodiment of FIG. 5 may become more clear, a more detailed description of its operation is in order. First, transistor 56 serves as a switch which is normally "off" (i.e., the collector-to-emitter resistance is very great in the absence of a positive potential between the base and the emitter). When a positive potential, such as that produced by the voltage drop across resistor 57, due to the flow of drive current in any of the stages, is applied to the base electrode, the collector-to-emitter impedance is substantially reduced. Depending upon the characteristics of the transistor and associated circuitry, this impedance can be regarded as zero.

As mentioned hereinabove, the conditions for restarting or retriggering the clock pulse generator require a drive pulse on Input A and a positive potential sufficient to produce a current exceeding the threshold current through the gate electrode of device 50 of the first stage. Since a drive current flowing through any of the stages results in an "on" condition of transistor 56, resistor 60 is effectively shorted to ground and no voltage can be developed at the first stage gate electrode. After the clock has stepped through the last stage and none of the stages is conducting, the next drive pulse on Input A triggers a new sequence of pulses, since transistor 56 is then in its "off" condition and Stage 1 is again capable of conducting.

Capacitor 59 serves to slow the rise time of the potential on the gate of Stage 1 thereby allowing time for transistor 56 to conduct, if it is to conduct at all. It also serves to short circuit transient signals which can be coupled to the gate electrode by stray capacitance between electrodes. This latter function is accomplished by voltage $V_b$ and biasing resistors 61 in the other stages. The capacitance of capacitor 59 can be reduced or it can be omitted if a very fast rise time is desired.

Figure 7:
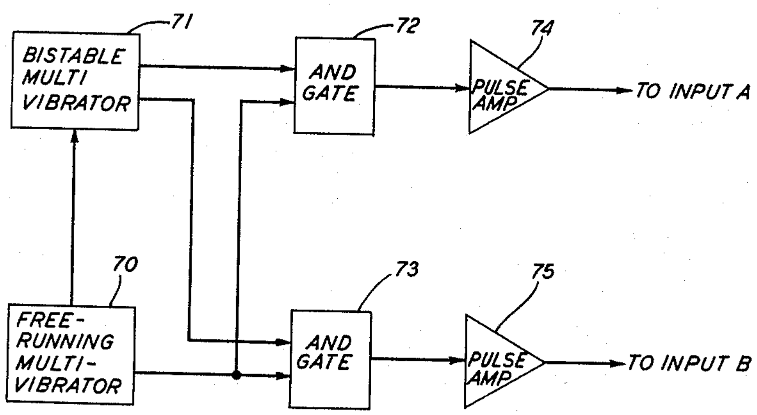
FIG. 7 is a block diagram of a power supply useful for supplying driving pulses of FIG. 6.

FIG. 7 is a block diagram of a two-phase power supply for supplying drive pulses to the clock pulse generator of FIG. 5. The power supply consists of free running multivibrator 70 which generates square wave pulses having a width equal to those of the drive pulses. Multivibrator 70 is coupled to bistable multivibrator 71. Multivibrator 71 has two outputs, one of which is 180 degrees out of phase with the other. Bistable multivibrator 71 furnishes square wave pulses of duration twice that of multivibrator 70. Each of the two outputs of multivibrator 71 is coupled to the inputs of two separate AND gates 72 and 73. The square wave drive pulse output from free running multivibrator 70 is also coupled to an input of both AND gates 72 and 73. The pulsed output from each of these devices is applied to the input of pulse amplifiers 74 and 75 which amplify the pulses to the power level required. The output of the pulse amplifiers then correspond to Inputs A and B of the clock pulse generator.

Figure 8:
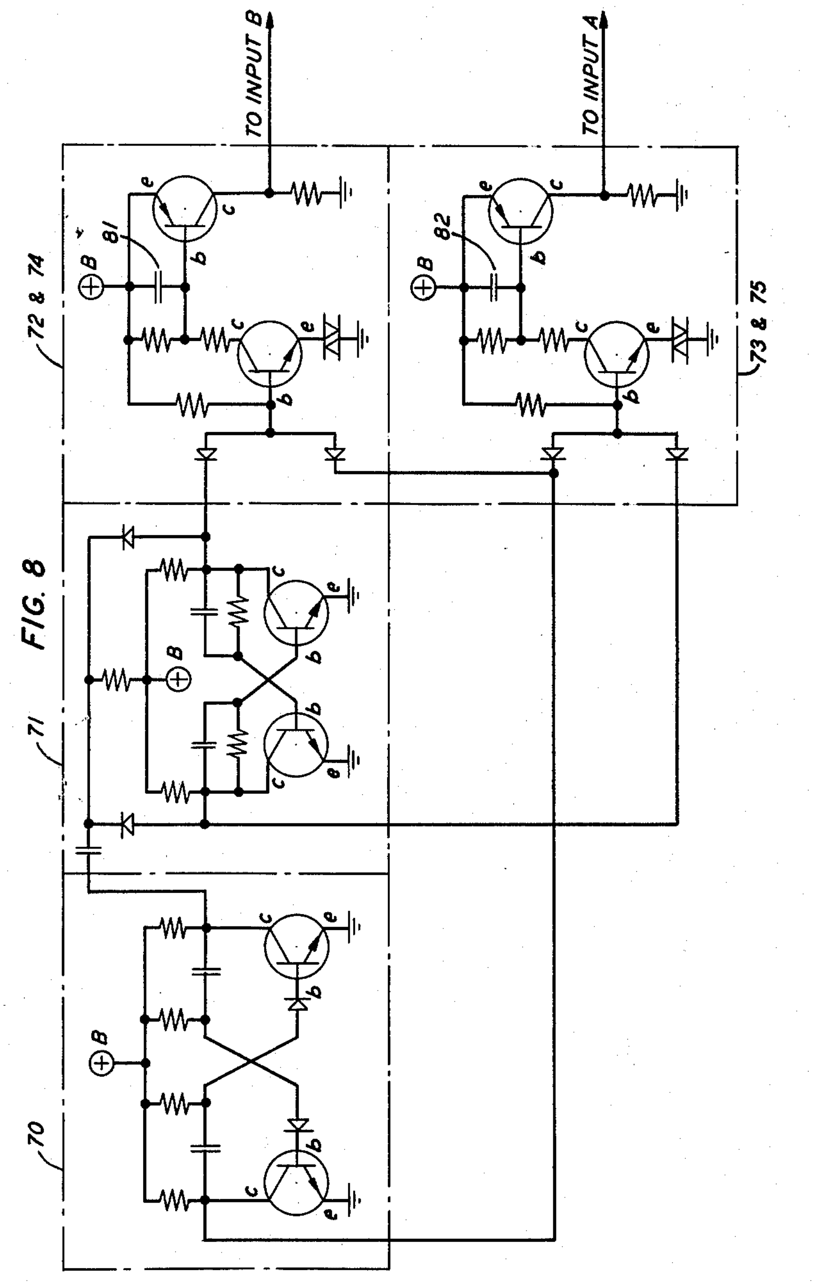
FIG. 8 is a schematic diagram of the power supply depicted in the block diagram of FIG. 7.

FIG. 8 is a schematic diagram of a two-phase power supply which can be utilized to provide the voltage pulses of FIG. 6. The combinations of circuit elements corresponding to the function blocks of FIG. 7 are indicated by the dashed lines. The numbering sequence of the blocks of FIG. 7 has been carried over to FIG. 8 in order that the circuit may be more readily understood.

The free-running multivibrator 70 and bistable multivibrator 71 of the power supply are similar to the circuits shown on pages 603 and 595, respectively, of the book "Pulse and Digital Circuits," by Millman and Taub. The AND gate and pulse amplifier circuits of each phase are combined and so labeled. The amplifiers are merely direct current-coupled pulse amplifiers. Capacitors 81 and 82 are connected across the base and emitter terminals of the second stage transistors of each amplifier in order to slow the rise time of the output pulses. These capacitors can be omitted if faster rise time is desired.

It is understood that the above described arrangements are merely illustrative of the application of the principles of the present invention. Numerous other arrangements may be devised by those skilled in the art without departing from the spirit and scope of this invention.

What is claimed is:

1. A stepping switch comprising, in combination, a plurality of bistable semiconductor devices arranged in a linear array, each device having an anode, a cathode and a gate electrode, the serial combination of a load impedance and a resistance connected between the cathode of each device and a common junction, reset means connected to the gate electrode of the first device of said array, the gate electrodes of each remaining device connected to the junction formed by the connection of said load impedance and said resistance of the next preceding device, and means for providing low magnitude memory current and high magnitude drive current to the anodes of each of said devices in a time sequence corresponding to their position in said array.

2. A clock pulse generator comprising, in combination, a plurality of bistable semiconductor devices arranged in a linear array, each of said devices having an anode, cathode and gate electrode, means for connecting a first resistance between the cathode of each of said devices and a first common junction, means for connecting a serial combination of a second, third and fourth resistance between the cathode of each device and the cathode of the next succeeding device of said array, means for connecting a capacitance between the junction formed by the connection of said second and third resistances and said first common junction, means for connecting the gate electrode of each device except the first to the junction formed by the connection of said third and fourth resistances of said next preceding stage, means for connecting a fifth resistance between said first common junction and ground, a sixth resistance connected between the gate electrode and the anode of the first device of said array, a seventh resistance connected between said gate electrode of said first device and ground, triggering means responsive to the voltage state of said first common junction for effectively short-circuiting said seventh resistance, and means for applying uniform voltage pulses to the anodes of said odd-numbered and even-numbered devices of said array alternately.

3. The combination according to claim 1 wherein said triggering means comprises a transistor in a grounded emitter configuration.

References Cited in the file of this patent

UNITED STATES PATENTS

| | | |
|---|---|---|
| 3,040,196 | D'Asaro | June 19, 1962 |
| 3,047,738 | Haas | July 31, 1962 |
| 3,100,850 | McMillian et al. | Aug. 13, 1962 |

OTHER REFERENCES

Publication I, "Ring Counter-Loads With Common Ground," Silicon Controlled Switch, April 1962, by G. E. Semiconductor Dept., Syracuse, New York.